United States Patent
Franke et al.

(10) Patent No.: US 10,250,028 B2
(45) Date of Patent: Apr. 2, 2019

(54) ELECTRICAL SWITCH

(71) Applicant: Siemens Aktiengesellschaft, Munich (DE)

(72) Inventors: Henry Franke, Berlin (DE); Stefan Haebel, Oberasbach (DE); Rainer Huentemeier, Nuremberg (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 373 days.

(21) Appl. No.: 15/145,937

(22) Filed: May 4, 2016

(65) Prior Publication Data

US 2016/0380426 A1    Dec. 29, 2016

(30) Foreign Application Priority Data

Jun. 24, 2015    (DE) .................. 10 2015 211 661

(51) Int. Cl.
| | |
|---|---|
| *H02H 3/00* | (2006.01) |
| *H02H 3/08* | (2006.01) |
| *H02J 3/00* | (2006.01) |
| *H02H 1/06* | (2006.01) |

(52) U.S. Cl.
CPC ............... *H02H 3/08* (2013.01); *H02J 3/006* (2013.01); *H02H 1/06* (2013.01)

(58) Field of Classification Search
CPC ....................................................... H02H 3/08
See application file for complete search history.

(56) References Cited

U.S. PATENT DOCUMENTS

| | | | |
|---|---|---|---|
| 5,959,819 A * | 9/1999 | Johnson | H02H 1/06 361/79 |
| 8,446,702 B2 | 5/2013 | Krauss et al. | |
| 8,614,867 B2 * | 12/2013 | Gotz | H01H 71/1081 361/42 |
| 2005/0135032 A1 * | 6/2005 | Faulkner | H02H 11/007 361/90 |
| 2007/0263337 A1 | 11/2007 | Bataille et al. | |
| 2013/0249315 A1 | 9/2013 | Zhou et al. | |

FOREIGN PATENT DOCUMENTS

| | | |
|---|---|---|
| CN | 103368539 A | 10/2013 |
| DE | 102009040692 A1 | 3/2011 |

OTHER PUBLICATIONS

Chinese Office Action and English translation thereof dated Nov. 16, 2017.

\* cited by examiner

*Primary Examiner* — Stephen W Jackson
(74) *Attorney, Agent, or Firm* — Harness, Dickey & Pierce, P.L.C.

(57) ABSTRACT

An electrical switch is disclosed for switching an electric current between a feed and an outgoer. The electrical switch can be mounted in a switchgear assembly and as a result electrical contact can be made with the electrical switch by a feed and an outgoer of the switchgear assembly. In one embodiment, the electrical switch includes an internal voltage tap for supplying power to a switch-internal electronics system and a changeover switch. The changeover switch adjusts the electrical connection between the feed or the outgoer and the internal voltage tap.

18 Claims, 2 Drawing Sheets

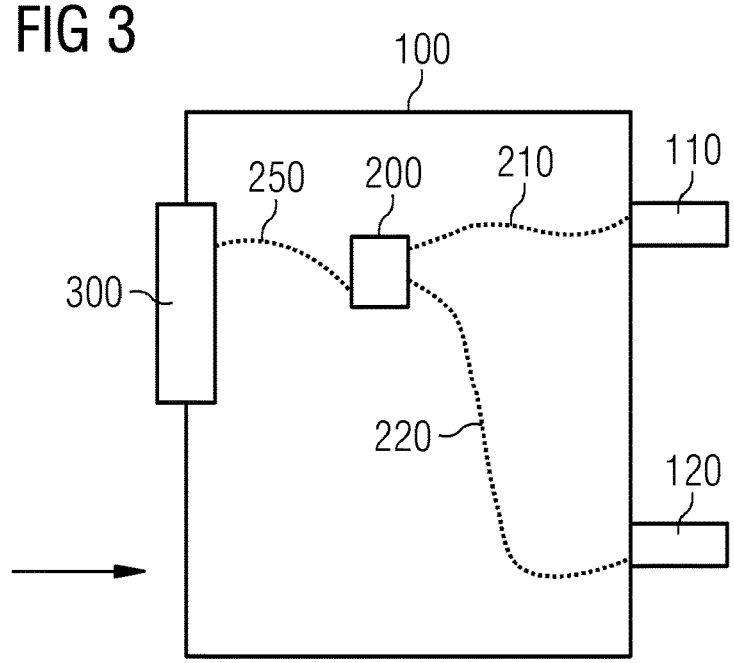
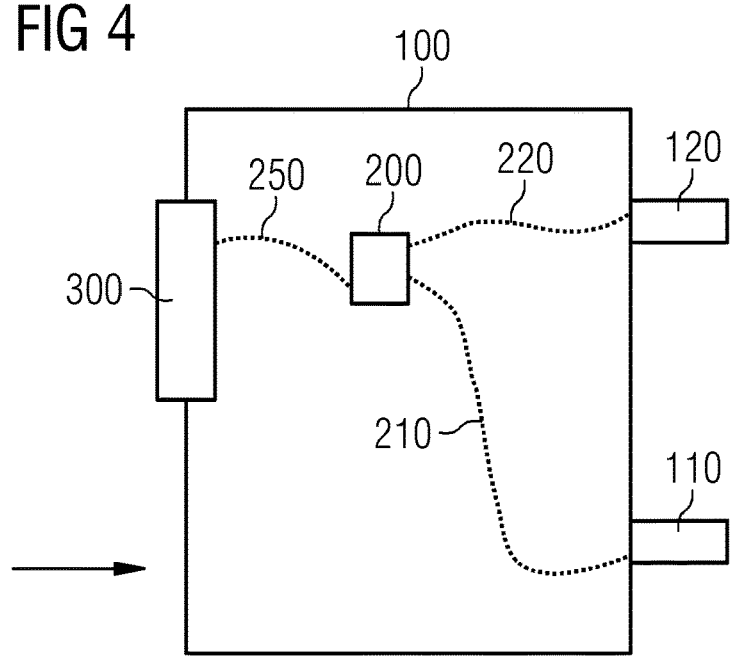

ELECTRICAL SWITCH

PRIORITY STATEMENT

The present application hereby claims priority under 35 U.S.C. § 119 to German patent application number DE 102015211661.1 filed Jun. 24, 2015, the entire contents of which are hereby incorporated herein by reference.

FIELD

At least one embodiment of the invention generally relates to an electrical switch for switching an electric current between a feed and an outgoer.

BACKGROUND

Electrical switches, particularly circuit breakers, are used in switchgear assemblies as feed and outgoer switches. Depending on the site of installation and the design of the switchgear assembly used, energy flows through an electrical switch or circuit breaker in the installation position from top to bottom or from bottom to top.

In order to supply power to a switch-internal electronics system, electrical switches, in particular circuit breakers, can have an internal voltage tap. The internal voltage tap has to tap off the voltage at the feed of the switchgear assembly. Said feed is located at the top or bottom main connection, depending on the installation position of the electrical switch. Therefore, the position of the voltage tap is typically defined when a customer places an order. One disadvantage of this is that the direction of the feed can change in the planning phase, with the result that circuit breakers have to be subsequently modified or reordered. This generates additional costs and a time delay for customers.

SUMMARY

At least one embodiment of the invention includes an electrical switch having an internal voltage tap which can be matched in a variable manner to the installation position of the electrical switch.

At least one embodiment of the invention is directed to an electrical switch. Advantageous refinements of the electrical switch according to at least one embodiment of the invention are indicated in the dependent claims.

At least one embodiment of the electrical switch for switching an electric current between a feed and an outgoer can be mounted in a switchgear assembly and as a result electrical contact can be made with said electrical switch by a feed and an outgoer of the switchgear assembly. At least one embodiment of the electrical switch comprises an internal voltage tap for supplying power to a switch-internal electronics system and comprises a changeover switch, wherein the changeover switch adjusts the electrical connection between the feed or the outgoer and the internal voltage tap.

BRIEF DESCRIPTION OF THE DRAWINGS

The above-described properties, features and advantages of this invention and the way in which they are achieved will become clearer and more easily understandable in connection with the following description of example embodiments which will be explained in more detail in connection with the figures, in which:

FIG. 3 shows an electrical switch with a changeover switch and with a feed above the outgoer; and FIG. 4 shows an electrical switch with a changeover switch and with a feed below the outgoer.

DETAILED DESCRIPTION OF THE EXAMPLE EMBODIMENTS

Figure 1:
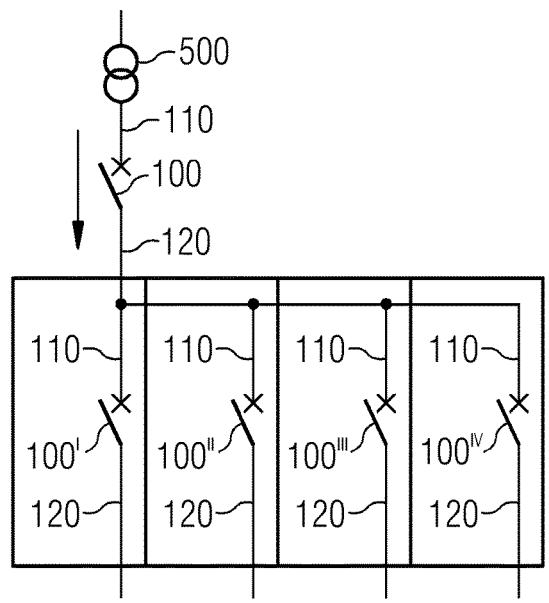
FIG. 1 shows an electrical switchgear assembly with feed and outgoer switches.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Further, although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/ hardware, that manipulates and transforms data represented as physical, electronic quantities within the computer system's registers and memories into other data similarly represented as physical quantities within the computer system memories or registers or other such information storage, transmission or display devices.

At least one embodiment of the electrical switch for switching an electric current between a feed and an outgoer can be mounted in a switchgear assembly and as a result electrical contact can be made with said electrical switch by a feed and an outgoer of the switchgear assembly. At least one embodiment of the electrical switch comprises an internal voltage tap for supplying power to a switch-internal electronics system and comprises a changeover switch, wherein the changeover switch adjusts the electrical connection between the feed or the outgoer and the internal voltage tap.

One advantage of this is that the electrical switch according to at least one embodiment of the invention can be used in a variable manner in a switchgear assembly and it is not important whether energy flows through the electrical switch from top to bottom or from bottom to top. Assemblies with an electrical switch according to at least one embodiment of the invention can be simply retrofitted since the electrical connection between the feed or the outgoer and the internal voltage tap can be adjusted by the changeover switch. As a result, conversion times can be shortened and conversion costs can be reduced since the electrical switch can be reconfigured by way of the changeover switch.

In one refinement, the switch-internal electronics system is an electronic trip unit (ETU) or a measurement unit (examples include current, voltage, power measurement)

which can be electrically connected to the feed or to the outgoer by the changeover switch. One advantage of this is that the supply of power to the electronic unit can be ensured by the changeover switch, even in the event of conversion of a switchgear assembly and a change in the direction of flow of energy through the electrical switch.

In a further refinement, when the electrical switch is in the installation position in the switchgear assembly, the feed is arranged physically above the outgoer and the changeover switch can connect the internal voltage tap for supplying power to the switch-internal electronics system to the feed arranged at the top. As an alternative, when the electrical switch is in the installation position in the switchgear assembly, the feed is arranged physically below the outgoer and the changeover switch can connect the internal voltage tap for supplying power to the switch-internal electronics system to the feed which is arranged at the bottom. Electrical switches are typically arranged on vertical walls in a switchgear assembly and therefore the feed and the outgoer are arranged above or below one another since the poles of the electrical switch are typically arranged next to one other. Therefore, the direction of flow of energy for each pole through the electrical switch is conventionally from top to bottom or from bottom to top.

In one refinement, the changeover switch additionally has an isolating position. This isolating position can advantageously be used for the purpose of being able to disconnect the internal voltage supply to the electronics system of the electrical switch from the switchgear assembly during insulation testing of the switchgear assembly. Insulation testing of this kind is typically carried out during start-up.

In further refinements, the changeover switch is formed by a wire bridge, a mechanical switch or an automatic changeover switch.

In one refinement, the changeover switch is located behind a front cover of the electrical switch.

In a further refinement, the switch-internal electronics system is a measurement sensor or a multifunctional device.

In one refinement, the electrical switch is a circuit breaker.

FIG. 1 shows an electrical switch 100 having an electrical feed 110 and an electrical outgoer 120. The electrical switch 100 is a feed switch and is supplied with electrical power via the transformer 500. The transformer 500 transforms, for example, the incoming high-voltage into an outgoing low-voltage at the feed 110. The arrow in FIG. 1 shows the direction of feeding and the direction of the flow of energy. The electrical outgoer 120 of the electrical switch 100 is connected to further outgoer switches. These outgoer switches 100', 100'', 100''', 100'V each again have a feed 110 and an outgoer 120 which leads to loads.

Figure 2:
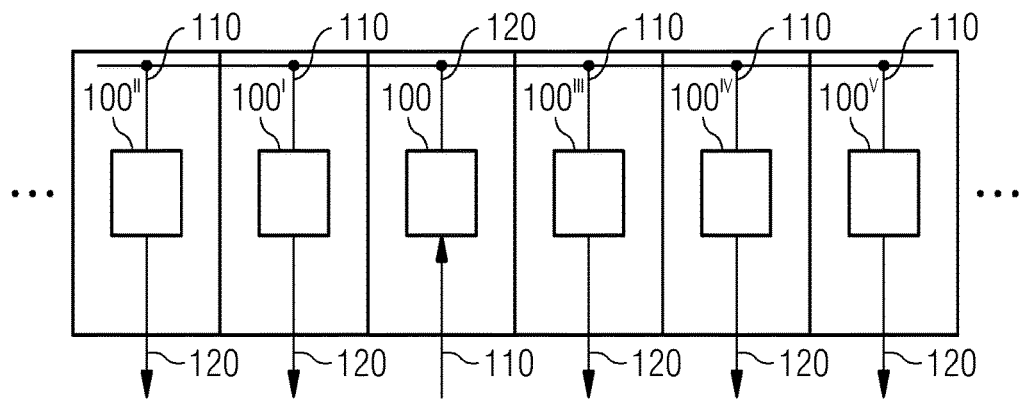
FIG. 2 shows an arrangement of feed and outgoer switches.

FIG. 2 shows the feed switch 100 and the outgoer switches 100', 100'', 100''', 100'V, 100V. In this case too, the outgoer 120 of the electrical switch 100 is electrically connected to the feeds 110 of the outgoer switches 100', 100'', 100''', 100'V, 100V. When the electrical switch 100 is in the installation position, energy flows from bottom to top in the feed switch 100 and from top to bottom in the outgoer switches 100', 100'', 100''', 100'V, 100V.

FIGS. 3 and 4 each show an electrical switch 100 which can be, for example, a feed switch or an outgoer switch of a switchgear assembly. According to FIG. 3, the electrical switch 100 comprises a feed 110 and an outgoer 120. When the electrical switch 100 is mounted in a switchgear assembly, a feed and an outgoer of the switchgear assembly can make contact with the feed 110 and the outgoer 120. By way of example, a busbar as the feed of the switchgear assembly can make contact with the feed 110, and a busbar as the outgoer of the electrical switchgear assembly can make contact with the outgoer 120.

The electrical switch 100 comprises an internal voltage tap 250 for supplying power to a switch-internal electronics system 300 and comprises a changeover switch 200. By way of example, the switch-internal electronics system 300 can be an electronic trip unit (ETU). The electronic trip unit serves, for example, to switch the electric current under special conditions. By way of example, protective functions of the electrical circuit are implemented in the electronic trip unit.

The changeover switch 200 is designed such that it can adjust the electrical connection between the feed 110 or the outgoer 120 and the internal voltage tap 250. Therefore, the changeover switch 200 can ensure that the internal voltage tap 250 can be supplied with the voltage of the feed 110.

According to FIG. 3, the feed 110 is arranged physically above the outgoer 120 when the electrical switch 100 is in the installation position in the switchgear assembly. In order that the switch-internal electronics system 300 can be supplied with voltage, the changeover switch 200 has to connect the feed 110 to the internal voltage tap 250. In accordance with FIG. 3, this means that the changeover switch 200 electrically connects the top current path 210 to the internal voltage tap 250. This ensures an electrically conductive connection between the switch-internal electronics system 300 and the feed 110.

FIG. 4 shows that the feed 110 is arranged physically below the outgoer 120 when the electrical switch 100 is in the installation position in the switchgear assembly. The changeover switch 200 electrically connects the switch-internal electronics system 300 to the feed 110 via the internal voltage tap 250 and the first current path 210. The second current path 220, which leads to the outgoer 120, is not electrically connected to the switch-internal electronics system.

In addition to the two switch positions of the first current path 210 and of the second current path 220, the changeover switch 200 can have an isolating position.

Insulation testing of the switchgear assembly, for example, can be carried out in this isolating position.

The electrical changeover switch 200 can be formed by a wire bridge, a mechanical changeover switch 200 or an automatic changeover switch 200. When the electrical switch 100 is installed in the switchgear assembly, the electrical wire bridge is placed in the electrical switch 100 by the installer. Similarly, a mechanical changeover switch 200 can ensure that the switch-internal electronics system 300 is connected to the feed 110. It is likewise feasible for the changeover switch 200 to be automatic and to identify whether the feed or the outgoer of the electrical switchgear assembly is connected to the first current path 210 or to the second current path 220.

The changeover switch 200 can be arranged physically behind a front cover of the electrical switch 100. By way of example, FIGS. 3 and 4 show that the front cover is located in the arrow direction and the changeover switch 200 is located within the electrical switch 100. It is likewise feasible for the changeover switch 200 to be integrated, for example, in the switch-internal electronics system 300 and therefore to be located on the surface of the electrical switch 100.

The switch-internal electronics system 300 can not only be an electronic trip unit (ETU), but rather likewise a measurement sensor or a multifunctional device. Any device which requires a voltage supply can be the switch-internal electronics system 300. The changeover switch 200 ensures that the switch-internal electronics system 300 is supplied with voltage depending on the mounting of the electrical switch 100 in the switchgear assembly.

The electrical switch 100 can be, for example, a circuit breaker which protects an electrical circuit via an electronic trip unit (ETU).

One advantage of the electrical switch 100 according to the invention is that the customer can determine where the voltage tap should be located during installation or start-up in the first instance. Additional costs and a time delay are avoided. Similarly, the variance of the circuit breakers is reduced and faulty orders are prevented.

The aforementioned description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods. Further, elements and/or features of different example embodiments may be combined with each other and/or substituted for each other within the scope of this disclosure and appended claims.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Still further, any one of the above-described and other example features of the present invention may be embodied in the form of an apparatus, method, system, etc. For example, of the aforementioned methods may be embodied in the form of a system or device, including, but not limited to, any of the structure for performing the methodology illustrated in the drawings.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An electrical switch for switching an electric current between a feed and an outgoer, wherein the electrical switch is mountable in a switchgear assembly and, as a result, an electrical connection can be made with the electrical switch by a feed and an outgoer of the switchgear assembly, the electrical switch comprising:
   an internal voltage tap to supply power to a switch-internal electronics system; and
   a changeover switch, configured to adjust the electrical connection between the feed or the outgoer, and the internal voltage tap, wherein the changeover switch additionally includes an isolating position.

2. The electrical switch of claim 1, wherein the switch-internal electronics system is an electronic trip unit or a measurement unit, electrically connectable to the feed or to the outgoer via the changeover switch.

3. The electrical switch of claim 1, wherein, when the electrical switch is in an installation position in the switchgear assembly, the feed is arranged physically above the outgoer and the changeover switch is configured to connect the internal voltage tap, to supply power to the switch-internal electronics system, to the feed arranged at the top.

4. The electrical switch of claim 1, wherein, when the electrical switch is in an installation position in the switchgear assembly, the feed is arranged physically below the outgoer and the changeover switch is configured to connect the internal voltage tap, to supply power to the switch-internal electronics system, to the feed arranged at the bottom.

5. The electrical switch of claim 1, wherein the changeover switch is formed by a wire bridge, a mechanical changeover switch or an automatic changeover switch.

6. The electrical switch of claim 1, wherein the changeover switch is located behind a front cover of the electrical switch.

7. The electrical switch of claim 1, wherein the switch-internal electronics system is a measurement sensor or a multifunctional device.

8. The electrical switch of claim 1, wherein the electrical switch is a circuit breaker.

9. The electrical switch of claim 2, wherein, when the electrical switch is in an installation position in the switchgear assembly, the feed is arranged physically above the outgoer and the changeover switch is configured to connect the internal voltage tap, to supply power to the switch-internal electronics system, to the feed arranged at the top.

10. The electrical switch of claim 2, wherein, when the electrical switch is in an installation position in the switchgear assembly, the feed is arranged physically below the outgoer and the changeover switch is configured to connect the internal voltage tap, to supply power to the switch-internal electronics system, to the feed arranged at the bottom.

11. The electrical switch of claim 2, wherein the changeover switch is formed by a wire bridge, a mechanical changeover switch or an automatic changeover switch.

12. The electrical switch of claim 2, wherein the changeover switch is located behind a front cover of the electrical switch.

13. The electrical switch of claim 2, wherein the switch-internal electronics system is a measurement sensor or a multifunctional device.

14. The electrical switch of claim 2, wherein the electrical switch is a circuit breaker.

15. A switchgear assembly comprising the electrical switch of claim 1.

16. A switchgear assembly comprising the electrical switch of claim 2.

17. A switchgear assembly comprising the electrical switch of claim 3.

18. A switchgear assembly comprising the electrical switch of claim 4.

* * * * *